(12) United States Patent
Byrne et al.

(10) Patent No.: US 6,180,272 B1
(45) Date of Patent: Jan. 30, 2001

(54) SYSTEM AND METHOD FOR AUTOMATICALLY PROVIDING FUEL TO A FUEL CELL IN RESPONSE TO A POWER FAILURE IN A PRIMARY POWER SYSTEM

(75) Inventors: Vincent M. Byrne; Marco A. Davila, both of Mesquite; Edward C. Fontana, Rockwall; Steven C. Stein, Dallas, all of TX (US)

(73) Assignee: Lucent Technologies Inc., Murray Hill, NJ (US)

( * ) Notice: Under 35 U.S.C. 154(b), the term of this patent shall be extended for 0 days.

(21) Appl. No.: 09/136,999

(22) Filed: Aug. 20, 1998

(51) Int. Cl.[7] ................................................ H01M 8/04
(52) U.S. Cl. ................................ 429/22; 429/23; 429/13; 429/12
(58) Field of Search .................... 429/22, 17, 13, 429/34, 35, 61, 12, 23

(56) References Cited

U.S. PATENT DOCUMENTS

| | | | |
|---|---|---|---|
| 4,253,428 | * | 3/1981 | Billings et al. ...................... 123/1 A |
| 4,883,724 | * | 11/1989 | Yamamoto ............................ 429/23 |
| 5,565,283 | | 10/1996 | Chalasani et al. ................... 429/187 |
| 5,990,575 | * | 11/1999 | Flaugher ............................... 307/23 |

FOREIGN PATENT DOCUMENTS

| | | | | |
|---|---|---|---|---|
| 3-118734 | * | 5/1991 | (JP) | ................................. H02J/9/06 |
| 6-251786 | * | 9/1994 | (JP) | ............................... H01M/8/04 |
| 62-26765 | * | 9/1994 | (JP) | ............................... H01M/8/04 |

* cited by examiner

*Primary Examiner*—Carol Chaney
*Assistant Examiner*—Raymond Alejandro

(57) ABSTRACT

The present invention provides, in one embodiment, a system for providing fuel to a backup electrical fuel cell. In this particular embodiment, the system includes a sealed fuel container having a pierceable membrane with a container seal associated therewith, an acerate tube proximate the pierceable membrane, and an actuator. The actuator is coupled to the acerate tube and automatically drives the acerate tube through the pierceable membrane to provide fluid communication from the fuel container to the fuel cell in response to a failure of a primary electrical power system. The container seal is configured to form a seal about the acerate tube when the acerate tube pierces the pierceable membrane to prevent unnecessary loss of fuel, such as methanol, from the container. In alternative embodiments, the system may also include the primary power system and a backup electrical fuel cell that is electrically coupled to the primary power system.

16 Claims, 4 Drawing Sheets

SYSTEM AND METHOD FOR AUTOMATICALLY PROVIDING FUEL TO A FUEL CELL IN RESPONSE TO A POWER FAILURE IN A PRIMARY POWER SYSTEM

TECHNICAL FIELD OF THE INVENTION

The present invention is directed, in general, to a system and method for providing fuel to a fuel cell and, more specifically, to a system and method for automatically providing fuel to a fuel cell in response to a power failure in a primary power system.

BACKGROUND OF THE INVENTION

In our complex society today, numerous systems rely upon electrical power to function properly. Under normal circumstances, operating power is provided by the commercial AC power distribution system for heat, air conditioning, traffic lights, cooking, telecommunications, etc. Since many, if not all, major power distribution lines are located on poles or towers, a natural disaster, such as a tornado, hurricane, or blizzard, frequently causes the loss of commercial AC power. The failure of commercial AC power may constitute a significant danger to life or property depending upon the system impacted. For instance, failure of AC power supplying the lighting or air conditioning in a hospital or nursing home could readily result in loss of life. Therefore, backup power systems have been developed to assure that the loss of primary power does not seriously affect critical systems.

The one critical system most often taken for granted is the telecommunications system. Significantly, when an emergency occurs, virtually everyone expects that telephone communications will remain unaffected. Clearly, this is essential since it is through the telephone that we normally summon medical or rescue aid. Therefore, because of this essential nature, the telecommunications system has been provided with a complex backup power system in the event of commercial AC power failure.

Traditionally, backup electricity for telecommunications has been achieved by dispersing batteries throughout the telecommunications system to power the necessary switches, amplifiers, etc., of the system. These batteries, amounting to millions worldwide, are located in special rooms, in enclosures atop telephone poles, or even atop mountains, depending upon the local system needs. These batteries may be in place for years before a power failure requires them. Naturally, these batteries employ a very well understood and proven technology. However, the batteries require physical maintenance from time to time, and generally require a charging circuit to maintain them at a sufficiently charged state to perform their intended function. The power fraction, that is the power developed per unit of weight, is typically very low for lead-acid batteries because the components are inherently extremely heavy. Additionally, the lead is very toxic and, when the batteries are no longer useable, must be properly recycled. In flooded cell batteries, the acid electrolyte is also a significant hazard to those who must service the batteries, or to anyone who comes in contact with them. The very nature of charging lead-acid batteries from the commercial power system causes gassing and consumes some of the water that is a part of the electrolyte solution, thereby necessitating service. In the case of valve-regulated lead-acid (VRLA) batteries, including many types of "maintenance free" batteries, the electrolyte may not be serviceable and the batteries are permanently degraded. Additionally, because battery life and capacity are dependent on ambient temperature, the state of the electrolyte chemistry, and the condition of the grids, it is difficult and expensive to predict the battery reserve power available at any given time. However, experience has shown that telecommunication grade VRLA batteries in non-extreme environmental conditions exhibit a useful life of about four to five years, regardless of the manufacturer's claims.

One alternative to batteries as a backup power source might be a generator powered by a liquid fuel. Significantly, the power fraction for liquid fuels is many times higher than that of lead-acid batteries. Such power generators for both AC and SC power generation are quite common; most are gasoline engine driven. Gasoline however has several disadvantages for a backup power system that may not be needed for several years. Gasoline is actually a mixture of several chemical compounds, each with its own volatility. Over even a short period, the lighter (high volatility) compounds evaporate more quickly, leaving the heavier components behind. This fuel condition makes starting the engine more difficult; as the longer the fuel stands, or the warmer the ambient temperature is, more of the lighter compounds evaporate. Also over time, the more complex organic compounds may break down into simpler compounds that are not as readily useable as fuel. While many liquid fuels are highly volatile and evaporate readily, one liquid fuel that is significantly more stable than gasoline is methanol ($CH_3OH$). Among the organic compounds, methanol is one of the simplest compounds, and therefore does not break down into other components. Although methanol will readily evaporate if left open to the atmosphere, it will remain stable for an extended period of time if kept in a well-sealed container.

As with any system, liquid fuels have some drawbacks. In some respects, they are more difficult to handle and store than the typical battery, simply because they are liquid. Measuring the fuel remaining involves measuring a liquid volume. Because the fuel quantity is analog in nature, there are no readily established decision points for accomplishing a refueling. Also, some type of a pumping capability must be provided to move the fuel to the generator.

Accordingly, what is needed in the art is a backup power system that takes advantage of the high power fraction of liquid fuels, methanol in particular, while providing: (a) an ease of handling the fuel, (b) elimination of fuel evaporation, (c) long shelf life fuel storage, (d) controlled quality of the liquid fuel, and (e) an easy decision point for refueling.

SUMMARY OF THE INVENTION

To address the above-discussed deficiencies of the prior art, the present invention provides, in one embodiment, a system for providing fuel to a backup electrical fuel cell, such as a generator. In this particular embodiment, the system includes a sealed fuel container having a pierceable membrane with a container seal associated therewith, an acerate tube proximate the pierceable membrane, and an actuator. The actuator is coupled to the acerate tube and automatically drives the acerate tube through the pierceable membrane to provide fluid communication from the fuel container to the fuel cell in response to a failure of a primary electrical power system. The container seal is configured to form a seal about the acerate tube when the acerate tube pierces the pierceable membrane to prevent unnecessary loss of fuel, such as methanol, from the container. In alternative embodiments, the system may also include the primary power system and a backup electrical fuel cell that is electrically coupled to the primary power system. Thus, this particular embodiment, provides a system that automatically provides fuel to a fuel cell in response to a failure of a primary electrical power system. As a primary electrical power system, such as a telecommunications power system, fails the present system senses the failure and automatically delivers fuel to a fuel cell, such as a generator, so that it, in turn, can provide an alternate source of electricity until the primary electrical power system is fully restored. The present invention, therefore, eliminates the need for constant servicing and maintenance that is typically required of conventional back-up power systems, such as batteries.

In one particular embodiment, the system further comprises a controller that determines when the actuator drives the acerate tube. The actuator may be a variety of mechanical or electrical devices such as an electrical controller, a mechanical controller, or an electromechanical controller. In another aspect, the system may further comprise a sensor that is electrically coupled to the controller and configured to sense a fuel level within the fuel container and transmit a fuel signal to the controller. In such instances, the controller causes the actuator to drive the acerate tube upon receiving the fuel level signal.

In another embodiment the sealed fuel container may comprise a plurality of sealed fuel containers each having a pierceable membrane. In such embodiments, the system further comprises an acerate tube proximate each of the pierceable membranes. This particular embodiment includes an embodiment where only one acerate tube is present in the system that can be automatically positioned, when needed, proximate each of the pierceable membranes. In those embodiments wherein there is a plurality of acerate tubes, each of the acerate tubes has an actuator coupled thereto that automatically drives the acerate tube through the pierceable membrane to provide fluid communication from each of the fuel containers to the fuel cell in response to a failure of the primary electrical power system. Alternatively, however, in those embodiments where just one acerate tube is present, only one actuator may be required to insert the acerate tube through the pierceable membrane.

In another aspect of this particular embodiment, the system may further comprise a controller that determines when each of the actuators drives each of the acerate tubes. In alternative embodiments, the system may include a plurality of such controllers. The system may further include a sensor, electrically coupled to the controller, that is configured to sense a fuel level within the fuel container and transmit a fuel level signal to the controller. Again, the controller causes one of the actuators to drive one of the acerate tubes upon receiving the fuel level signal. As in other embodiments described above, the actuator may be an electrical controller, a mechanical controller, or an electromechanical controller.

The present invention also provides a method for providing fuel to a backup electrical fuel cell. An advantageous method includes automatically driving an acerate tube proximate a pierceable membrane of a sealed fuel container with an actuator coupled to the acerate tube, piercing the pierceable membrane with the acerate tube, forming a seal about the acerate tube with a container seal associated with the pierceable membrane when the acerate tube pierces the membrane, and providing fluid communication from the fuel container to the fuel cell in response to a failure of a primary electrical power system.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
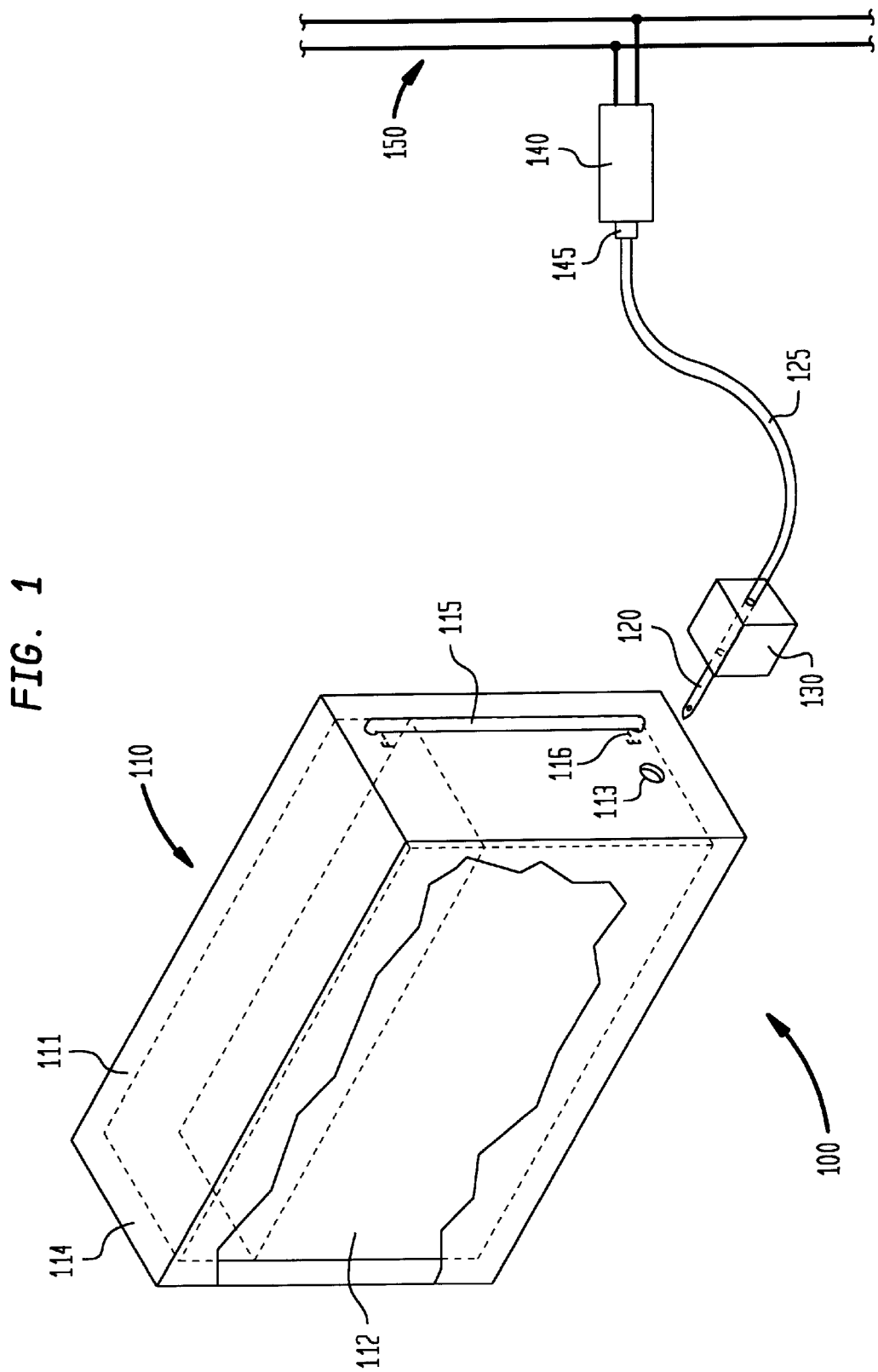
FIG. 1 illustrates an isometric view of one embodiment of a liquid fuel storage and delivery system constructed according to the principles of the present invention.

Referring initially to FIG. 1, illustrated is an isometric view of one embodiment of a liquid fuel storage and delivery system constructed according to the principles of the present invention. The liquid fuel storage and delivery system, generally designated 100, comprises a sealed fuel container 110, an acerate tube 120, and an actuator 130. In one embodiment, the fuel container 110 comprises a protective carton 111, a flexible bladder 112, a container seal 113, and a fuel sight gauge 115. The protective carton 111 may be manufactured of any suitable rigid material, e.g., heavy cardboard, plastic, hardboard, etc., which offers the desired degree of protection to the bladder 112 and its contents during shipping, handling, and storage. In one embodiment, the interior of the protective carton 111 may be communicated with ambient air pressure so that the fuel will flow out of the bladder 112 due to air pressure. In an alternative embodiment, a positive fuel head may be provided by a pressure bleed conduit taken from a pressure source, e.g., the pressure stage of a microturbine 140 to be described below, and fed into the cavity 114 between the bladder 112 and the inside of a sealed protective carton. It should be noted that such a pressure source is available during starting even before the microturbine or engine is running. In yet another embodiment, the cavity 114 between the bladder 112 and the inside of the sealed protective carton 111 of the previous embodiment may be factory-pressurized with a suitable gas to provide a positive flow of fuel. In yet another alternative embodiment, the protective carton 111 may comprise a rigid shape with an integral, impermeable, pierceable membrane that is internally factory-pressurized with a gas. One who is skilled in the art will recognize that the shape and size of the protective carton 111 may vary, or may even be absent, and is not a limiting factor of the present invention.

In one advantageous embodiment, the flexible bladder 112 comprises an impermeable, pierceable membrane containing a liquid fuel, such a plastic-based or metalized film. In the illustrated embodiment, the container seal 113 is a flexible, rubber-like circular mass assembled by any suitable means, e.g., adhesive, thermoforming, etc., to the flexible bladder 112. One who is skilled in the art will readily recognize that the container seal 113 may also be any or all of: (a) integral to and formed of the same material as the flexible bladder 112, (b) manufactured of any material acceptable for the intended purpose, and (c) of any appropriate shape. In one particularly advantageous embodiment, the liquid fuel within the bladder 112 is methanol. In one advantageous embodiment, the fuel sight gauge 115 may be fluidly coupled to the bladder 112, providing a visual indication of fuel remaining within the container 110. To ease the decision making of replacing an "empty" container, a mark 116 may be inscribed on the container 110 or fuel sight gauge 115 to indicate a fuel level below which the container is considered empty. In this embodiment, a colorant may be added to the colorless methanol, if necessary, to show the remaining fuel level. One who is skilled in the art will readily envision other methods of determining fuel remaining within the container 110.

In the illustrated embodiment, the acerate tube 120 is proximate the bladder 112 and the container seal 113. The acerate tube 120 is in fluid connection with a fuel control mechanism 145 of a microturbine 140 by a flexible conduit 125. The acerate tube 120 is configured to be driven by the actuator 130 into the bladder 112. In one embodiment, the actuator 130 is a mechanical, spring-loaded device that holds the acerate tube 120 away from the container seal 113 so long as commercial electrical power is applied to a primary electrical power distribution system 150. Upon commercial power failure, the acerate tube 120 is released, and the spring-loaded device drives the acerate tube 120 through the permeable membrane of the bladder 112. As the acerate tube 120 passes through the container seal 113, the flexible container seal 113 constricts about the acerate tube 120 and prevents air or liquid from leaking around the acerate tube 120. With the opening of the acerate tube 120 within the bladder 112 and in contact with the fuel, the methanol fuel flows under ambient air pressure through a flexible conduit 125 to the microturbine 140 or other electrical generating device, such as a fuel cell. The electrical output of the microturbine 140 is electrically connected to the electrical power distribution system 150. When provided with fuel, the microturbine 140 starts and powers the electrical power distribution system 150. One who is skilled in the art is familiar with methods for starting a microturbine 140. In a particularly advantageous embodiment the electrical power distribution system 150 supplies power to a telecommunications system, however, one who is skilled in the art will readily identify other applications.

Figure 2:
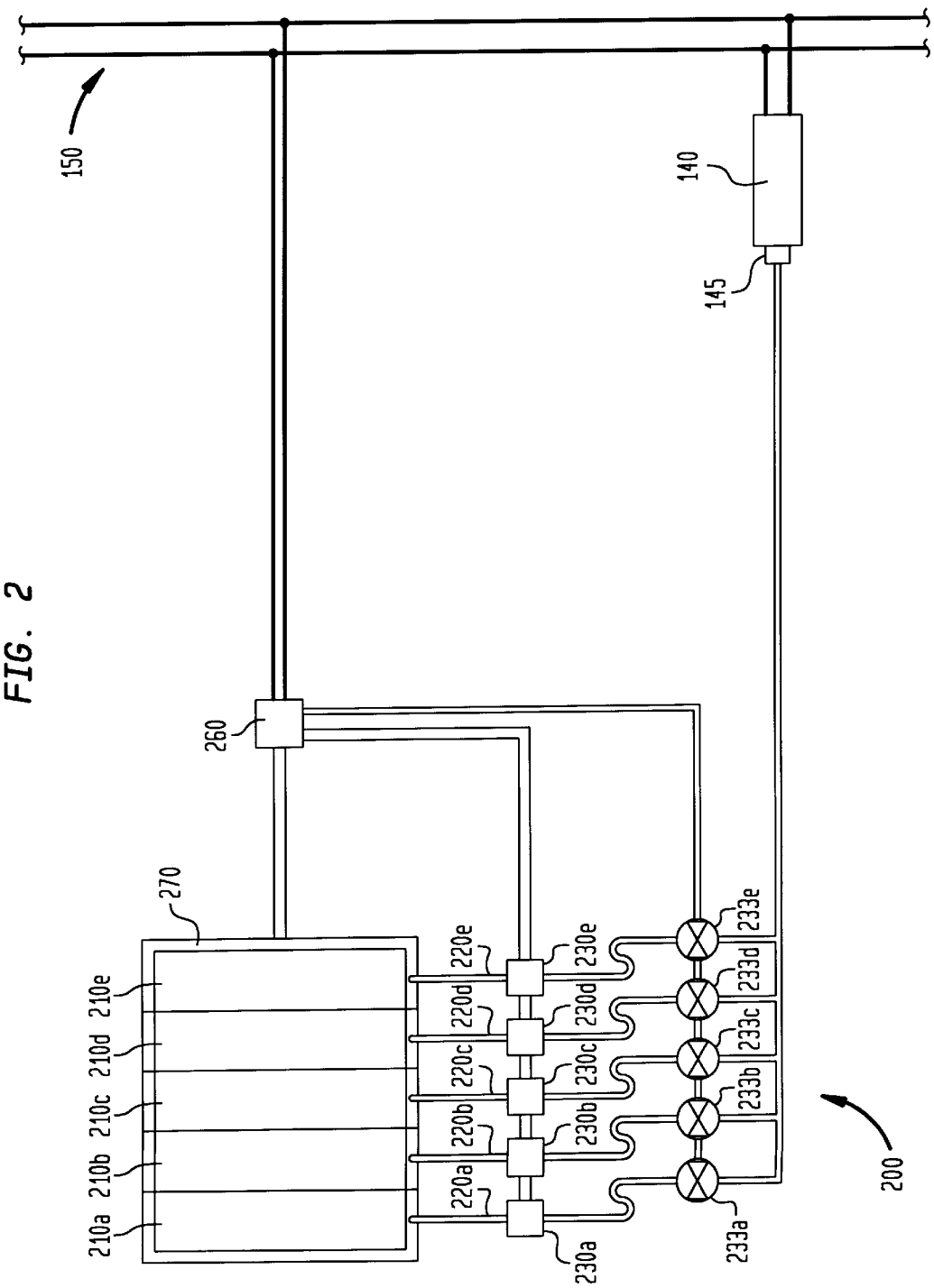
FIG. 2 illustrates a plan view of an alternative embodiment of the liquid fuel storage and delivery system of FIG. 1.

Referring now to FIG. 2, illustrated is a plan view of an alternative embodiment of the liquid fuel storage and delivery system of FIG. 1. In the illustrated embodiment, a liquid fuel storage and delivery system 200 comprises a plurality of fuel containers 210a–210e, a corresponding plurality of acerate tubes 220a–220e, a corresponding plurality of actuators 230a–230e, and a controller 260. The operation and function of the plurality of acerate tubes 220a–220e, actuators 230a–230e, and fuel containers 210a–210e are analogous to the acerate tube 120, actuator 130, and fuel container 110, respectively, of FIG. 1. Although the system 200 is described with five fuel containers 210a–210e, one who is skilled in the art will recognize that analogous systems may be constructed to employ a quantity of fuel containers ranging in number from a single container to n containers while remaining within the scope of the present invention. In this embodiment, any empty container 210a–210e may be removed and replaced with a new, sealed container while the fuel cell 140 is running on fuel from a different container 210. Because the containers 210a–210e remain sealed until needed, the hazard of fire during refueling is significantly reduced.

In a particularly advantageous embodiment, the controller 260 is connected to: the primary electrical power distribution system 150, the actuators 230a–230e, and a fuel level sensor 270. The fuel level sensor 270 is proximate the fuel containers 210a–210e so as to be able to measure and manage the fuel remaining in each container 210a–210e. In one embodiment, the fuel level sensor 210 may be a plurality of strain gauges or a segmented electronic scale that provides a quantity for each individual fuel container 210a–210e to the controller 260. One who is skilled in the art will readily conceive of other methods by which the fuel status may be ascertained. In one embodiment, the controller 260 is an electrical controller that electrically monitors the power status of the primary power distribution system 150 and the fuel remaining in the fuel containers 210a–210e so as to operate an appropriate actuator 230a–230e when primary electrical power fails. The controller 260 may also selectively operate a plurality of valves 233a–233e that control fuel flow to the microturbine 140 and limit fuel loss through evaporation into empty fuel containers. To provide for long term primary power outages, the system 200 may employ multiple fuel containers 210a–210e as shown. As each fuel container approaches empty, the controller 260 selects an unused fuel container to provide uninterrupted fuel to a microturbine 140. Alternatively, a plurality of fuel containers 210a–210e may be employed at remote sites to provide power in the event of multiple power failures over an extended period of time, e.g., several years, without an urgent need to replace expended fuel containers. One who is skilled in the art will readily recognize that alternative embodiments employing mechanical or electromechanical controllers are clearly within the scope and intent of the present invention. In yet another alternative embodiment, the controller 260 may also comprise a microprocessor that monitors the total fuel remaining and automatically sends an alert message to an attendant if the fuel level falls below a required minimum. Also, one who is skilled in the art will recognize that the controller 260 of the described system 200 may be capable of distinguishing and tracking the fuel quantity within each container 210a–210e so as to compensate for an unexpectedly, empty container.

Figure 3:
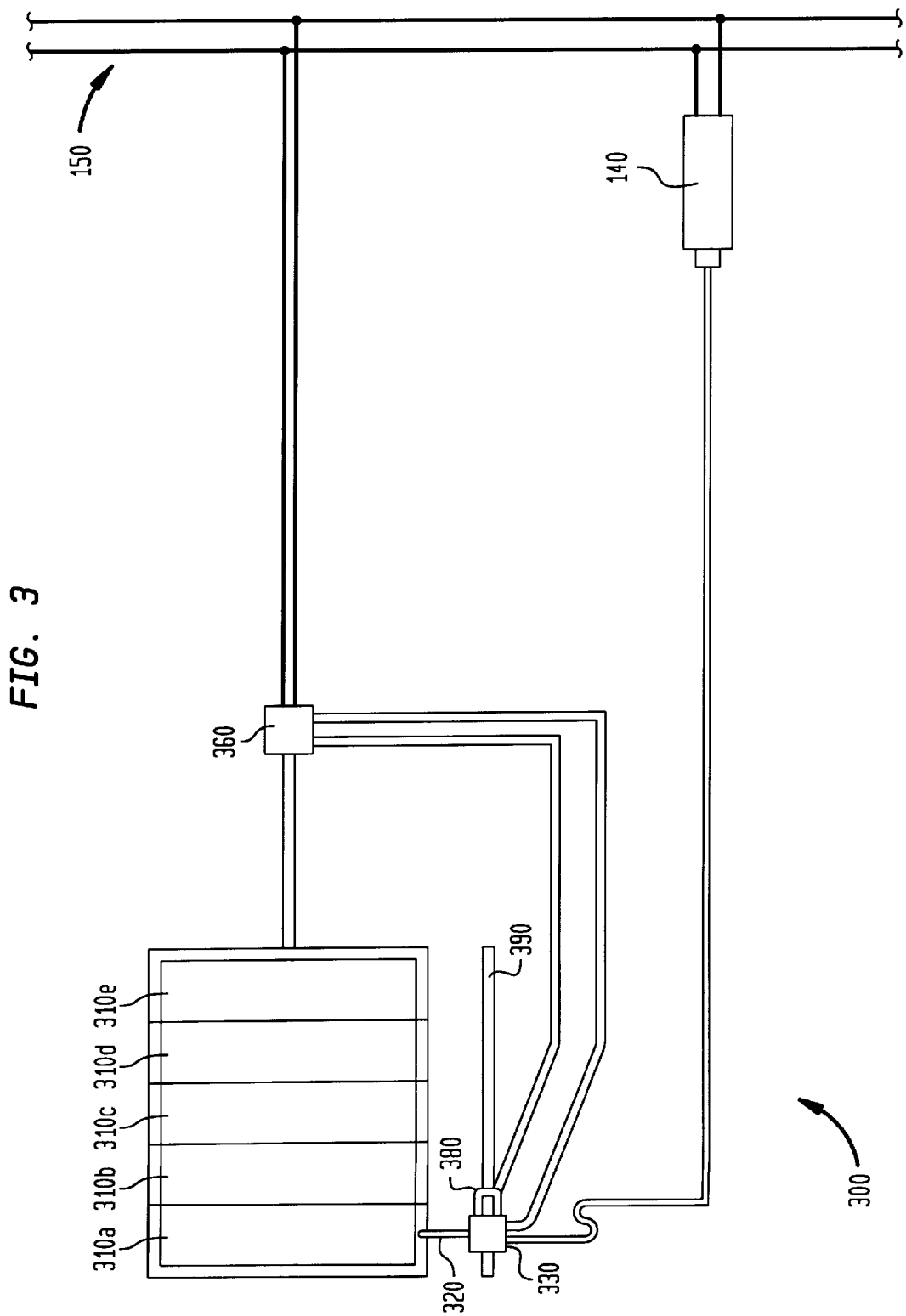
FIG. 3 illustrates an alternative embodiment of the liquid fuel storage and delivery system of FIG. 2.

Referring now to FIG. 3, illustrated is an alternative embodiment of the liquid fuel storage and delivery system of FIG. 2. In the illustrated embodiment, a liquid fuel storage and delivery system 300 comprises a plurality of fuel containers 310a–310e, an acerate tube 320, an actuator 330, a controller 360, a positioner 380, and a positioning rail 390. The operation and function of the controller 360 and fuel containers 310a–310e are analogous to the controller 260 and fuel containers 210a–210e of FIG. 2. Upon determination of a need for fuel, the controller 360: (a) selects a fuel container 310a–310e to provide fuel for the microturbine 140, (b) commands the positioner 380 to move the actuator 330 and the acerate tube 320 proximate the selected fuel container 310a–310e along the positioning rail 390, and (c) commands the actuator 330 to drive the acerate tube 320 to puncture the bladder of the selected fuel container 310a–310e. Although the illustrated embodiment details an electromechanical system, one who is skilled in the art will readily envision alternative methods of positioning the actuator 330 and acerate tube 320.

Figure 4:
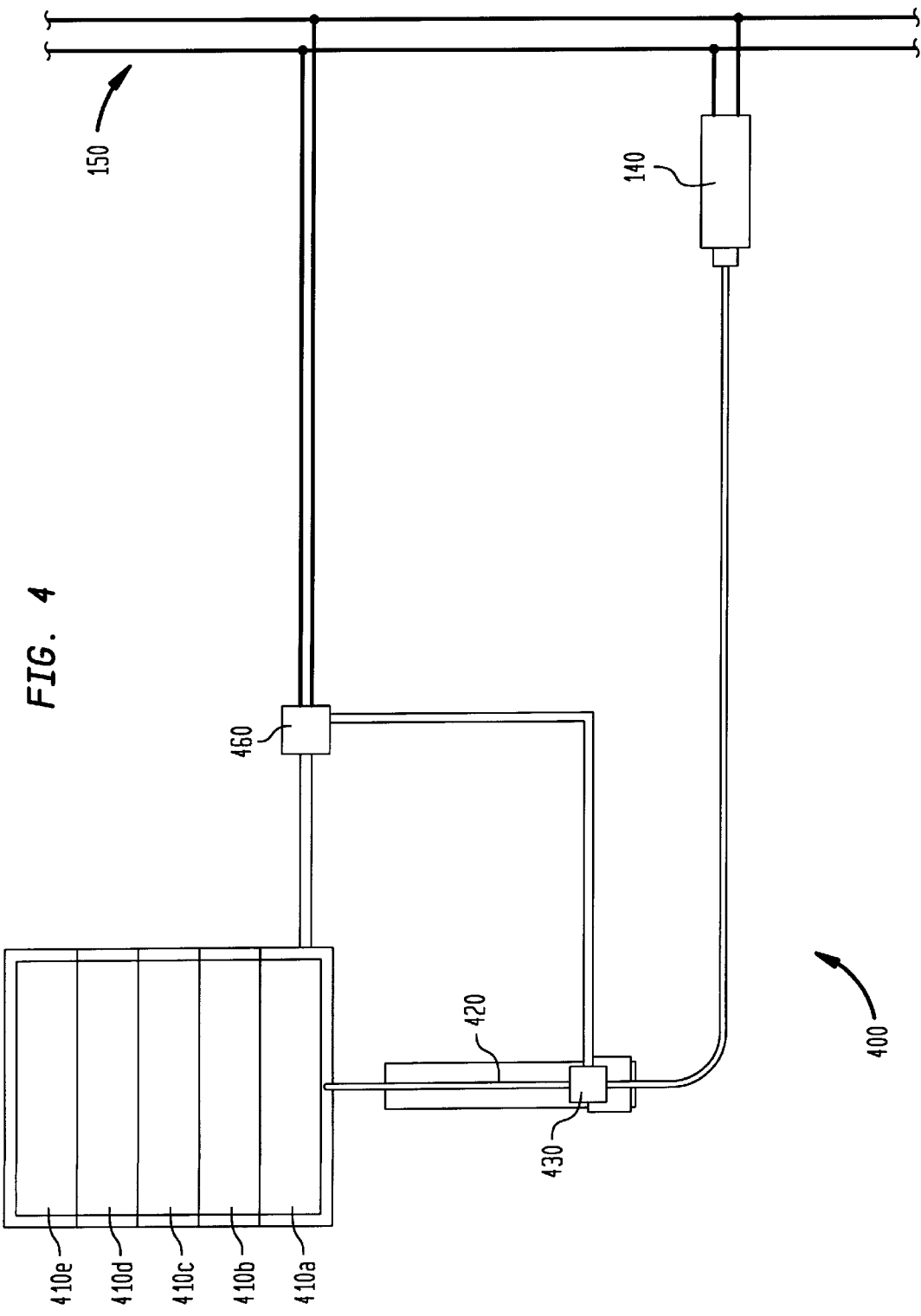
FIG. 4 illustrates an alternative embodiment of the liquid fuel storage and delivery system of FIG. 3.

Referring now to FIG. 4, illustrated is an alternative embodiment of the liquid fuel storage and delivery system of FIG. 3. In the illustrated embodiment, a liquid fuel storage and delivery system 400 comprises a plurality of fuel containers 410a–410e, an acerate tube 420, an actuator 430, and a controller 460. The operation and function of the controller 460 and fuel containers 410a–410e are analogous to the controller 360 and fuel containers 310a–310e of FIG. 3. Upon determination of the first need for fuel, the controller 460 commands the actuator 430 to advance the acerate tube 420 sufficiently to puncture the bladder of the first fuel container 410a, positioning the opening in the acerate tube 420 within the bladder. Upon determination of a second need for fuel, the controller 460 commands the actuator 430 to advance the acerate tube 420 through the remaining wall of the bladder in the first fuel container 410a and sufficiently beyond to puncture the bladder of the second fuel container 410b. Each successive fuel container 410c–410e may be accessed in a similar manner. Although the illustrated embodiment details an electromechanical system, one who is skilled in the art will readily envision alternative methods of positioning the actuator 430 and acerate tube 420.

From the foregoing, it is readily apparent that the present invention provides a system for providing fuel to a backup electrical fuel cell. The system preferably includes a scaled fuel container having a pierceable membrane with a container seal associated therewith, an acerate tube proximate the pierceable membrane, and an actuator. The actuator is coupled to the acerate tube and automatically drives the acerate tube through the pierceable membrane to provide fluid communication from the fuel container to the fuel cell in response to a failure of a primary electrical power system. The container seal is configured to form a seal about the acerate tube when the acerate tube pierces the pierceable membrane to prevent unnecessary loss of fuel, such as methanol, from the container. In alternative embodiments, the system may also include the primary power system and a backup electrical fuel cell that is electrically coupled to the primary power system.

Although the present invention has been described in detail, those skilled in the art should understand that they can make various changes, substitutions and alterations herein without departing from the spirit and scope of the invention in its broadest form.

What is claimed is:

1. A system for providing fuel to a backup electrical fuel cell, comprising:
    a sealed fuel container having a pierceable membrane with a container seal associated therewith;
    an acerate tube proximate said pierceable membrane; and
    an actuator, coupled to said acerate tube, that automatically drives said acerate tube through said pierceable membrane to provide fluid communication from said fuel container to said fuel cell in response to a failure of a primary electrical power system, said container seal configured to form a seal about said acerate tube when said acerate tube pierces said pierceable membrane.

2. The system as recited in claim 1 further comprising a controller that determines when said actuator drives said acerate tube.

3. The system as recited in claim 2 wherein said actuator is selected from the group consisting of:
    an electrical actuator,
    a mechanical actuator, and
    an electromechanical actuator.

4. The system as recited in claim 2 further comprising a sensor electrically coupled to said controller and configured to sense a fuel level within said fuel container and transmit a fuel signal to said controller, said controller causing said actuator to drive said acerate tube upon receiving said fuel level signal.

5. The system as recited in claim 1 wherein said sealed container contains methanol.

6. The system as recited in claim 1 wherein said sealed fuel container comprises a plurality of sealed fuel containers each having a pierceable membrane.

7. The system as recited in claim 6 further comprising an acerate tube proximate each of said pierceable membranes, each of said acerate tubes having an actuator coupled thereto that automatically drives said acerate tube through said pierceable membrane to provide fluid communication from each of said fuel containers to said fuel cell in response to a failure of said primary electrical power system.

8. The system as recited in claim 7 further comprising a controller that determines when each of said actuators drives each of said acerate tubes.

9. The system as recited in claim 8 wherein said actuator is selected from the group consisting of:
    an electrical actuator,
    a mechanical actuator, and
    an electromechanical actuator.

10. The system as recited in claim 6 wherein each of said plurality of containers includes a sensor electrically coupled to said controller and configured to sense a fuel level within said fuel container and transmit a fuel level signal to said controller, said controller causing one of said actuators to drive one of said acerate tubes upon receiving said fuel level signal.

11. The system as recited in claim 1 wherein said sealed fuel container further comprises a fuel sight gauge.

12. A method for providing fuel to a backup electrical fuel cell, comprising:
    automatically driving an acerate tube proximate a pierceable membrane of a sealed fuel container with an actuator coupled to said acerate tube;
    piercing said pierceable membrane with said acerate tube;
    forming a seal about said acerate tube during said piercing with a container seal associated with said pierceable membrane; and
    providing fluid communication from said fuel container to said fuel cell in response to a failure of a primary electrical power system.

13. The method as recited in claim 12 further comprising determining when said actuator drives said acerate tube with a controller.

14. The method as recited in claim 13 wherein said determining includes determining with a actuator selected from the group consisting of:
    an electrical actuator,
    a mechanical actuator, and
    an electromechanical actuator.

15. The method as recited in claim 13 further comprising:
    sensing a fuel level within said fuel container with a sensor electrically coupled to said controller;
    transmitting a fuel signal from said sensor to said controller; and
    causing said controller to cause said actuator to drive said acerate tube upon said controller receiving said fuel level signal.

16. The method as recited in claim 12 wherein said providing fluid communication includes providing methanol to said electrical fuel cell.

* * * * *